(12) United States Patent
Tersmette et al.

(10) Patent No.: US 11,143,052 B2
(45) Date of Patent: Oct. 12, 2021

(54) DUAL-MODE PLUG NOZZLE

(71) Applicant: General Electric Company, Schenectady, NY (US)

(72) Inventors: Trevor Andrew Tersmette, Montogomery, OH (US); Jason Adam Lee, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 320 days.

(21) Appl. No.: 16/267,978

(22) Filed: Feb. 5, 2019

(65) Prior Publication Data

US 2020/0025022 A1    Jan. 23, 2020

Related U.S. Application Data

(62) Division of application No. 14/894,739, filed as application No. PCT/US2014/039914 on May 29, 2014, now abandoned.

(Continued)

(51) Int. Cl.
*F01D 17/14*    (2006.01)
*F02K 1/09*    (2006.01)
(Continued)

(52) U.S. Cl.
CPC .............. *F01D 17/14* (2013.01); *F01D 9/02* (2013.01); *F02K 1/08* (2013.01); *F02K 1/09* (2013.01);
(Continued)

(58) Field of Classification Search
CPC ....... B64D 33/04; F01D 17/14; F01D 17/141; F01D 9/02; F02K 1/06; F02K 1/08;
(Continued)

(56) References Cited

U.S. PATENT DOCUMENTS 4,043,508 A    8/1977    Speir et al.
4,050,242 A    9/1977    Dusa
(Continued)

FOREIGN PATENT DOCUMENTS

EP    0779429 A2    6/1997
FR    2902839 A1    12/2007
(Continued)

OTHER PUBLICATIONS

International Search Report and Written Opinion issued in connection with corresponding application PCT/US2014/039914 dated Apr. 9, 2015.
(Continued)

*Primary Examiner* — Scott J Walthour
(74) *Attorney, Agent, or Firm* — Venable LLP; Elizabeth C. G. Gitlin; Michele V. Frank

(57) ABSTRACT

A method for controlling flow through an exhaust nozzle includes: providing a centerbody including a maximum diameter section; providing an inner shroud surrounding the centerbody, including at least a middle section of decreased diameter and terminating at an aft edge; providing an outer shroud. wherein the centerbody and the inner shroud collectively define a throat, and the outer shroud and the centerbody collectively define an exit; selectively translating the inner shroud and outer shroud to vary the throat; and selectively translating the outer shroud to vary the ratio of the exit to the throat; wherein, when the inner shroud is in a forward position, its aft edge is forward of the maximum diameter section of the centerbody, such that the throat of the nozzle is formed between the aft edge of the inner shroud and the centerbody.

15 Claims, 4 Drawing Sheets

Related U.S. Application Data

(60) Provisional application No. 61/829,495, filed on May 31, 2013.

(51) Int. Cl.
*F02K 1/08* (2006.01)
*F01D 9/02* (2006.01)

(52) U.S. Cl.
CPC .... *F05D 2220/32* (2013.01); *F05D 2240/128* (2013.01); *F05D 2250/41* (2013.01); *Y02T 50/60* (2013.01)

(58) Field of Classification Search
CPC .. F02K 1/09; F05D 2220/80; F05D 2240/128; F05D 2240/1281; F05D 2250/41; F05D 2250/50
See application file for complete search history.

(56) References Cited

U.S. PATENT DOCUMENTS

| | | |
|---|---|---|
| 7,174,704 B2 | 2/2007 | Renggli |
| 2005/0229586 A1 | 10/2005 | Whurr |
| 2009/0188233 A1 | 7/2009 | Vauchel et al. |
| 2010/0095650 A1* | 4/2010 | Schafer .................... F02K 1/09 60/226.3 |
| 2010/0162684 A1 | 7/2010 | Baker |
| 2012/0192543 A1 | 8/2012 | Aeberli |

FOREIGN PATENT DOCUMENTS

| | | |
|---|---|---|
| GB | 1114478 A | 5/1968 |
| WO | 2008045061 A1 | 4/2008 |

OTHER PUBLICATIONS

Unofficial English Translation of Chinese Office Action issued in connection with corresponding CN Application No. 201480031311.2 dated Jul. 4, 2016.

* cited by examiner

DUAL-MODE PLUG NOZZLE

CROSS-REFERENCE TO RELATED APPLICATIONS

This application is a divisional of U.S. patent application Ser. No. 14/894,739 filed on Nov. 30, 2015, which is a national stage application under 35 U.S.C. § 371(c) of PCT application serial number PCT/US2014/39914, filed on May 29, 2014 which claims priority to U.S. Patent Application Ser. No. 61/829,495, titled "Dual-Mode Plug Nozzle" and having filing date May 31, 2013, all of which are incorporated by reference herein.

STATEMENT REGARDING FEDERALLY SPONSORED RESEARCH & DEVELOPMENT

The US Government may have certain rights in this invention pursuant to Contract No. MDA972-01-3-0002 (DARPA) awarded by the US Department of Defense.

BACKGROUND

Embodiments of the present invention relates generally to nozzles for gas turbine engines and more particularly to a variable geometry nozzle which functions as a convergent nozzle, a divergent nozzle or a convergent-divergent nozzle.

Variable geometry is required where exhaust systems for gas turbine engines operate over a wide range of pressure ratios (i.e. nozzle throat pressure/ambient pressure or P8/Pamb) where the nozzle throat area (A8) must be adjusted to meet the demands of the engine cycle. Additionally, the nozzle area ratio (A9/A8) must be adjusted in order to attain good performance at various operating points.

Historically, the wide range of values for A8 has resulted in degraded performance at some flight conditions. In contrast and according to some aspects of the instant embodiments, a wide range of variability in values for A8 is provided while retaining superior performance throughout all flight conditions. Prior art exhaust nozzles include those having fixed exhaust systems typically having been applied in commercial subsonic engines, and variable geometry exhaust nozzles typically having been applied in supersonic military aircraft engines, some of which also use afterburners.

Fixed nozzles do not kinematically change their geometry and thus do not operate efficiently over a wide range of nozzle pressure ratios (P8/Pamb).

Variable geometry exhaust nozzles in the prior art, include those wherein control of the throat area A8 and of the area ratio has typically been established by "linking" the A9/A8 ratio to A8, thereby resulting in a kinematically linked area ratio schedule. For example, some nozzles have utilized a circumferential series of overlapping flaps and seals, a flap and seal structure, in order to create a convergent flow path that establishes a value for A8. A similar set of overlapping flaps and seals is connected to the aft end of the convergent flaps and seals and establishes the divergent portion of the nozzle and thus defines the exit area A9 of the nozzle. The divergent flaps are also kinematically linked via a separate kinematic member (a compression link for instance) to a relatively stationary part of the engine exhaust system such as a duct. The resulting four-bar linkage of duct, convergent flap, divergent flap, and compression link defines the kinematic relationship of the nozzle exit area, A9, to the nozzle throat area, A8; and thus defines the A9/A8 area ratio schedule as a function of A8. This typically results in an A9/A8 schedule which increases as A8 increases. Because of the overlapping flap and seal structure, leakage paths may be created which reduce operating efficiency. In addition, it may be beneficial to reduce the number of parts required, thereby reducing cost, weight, maintenance effort, and improving reliability. Furthermore, for a number of engine cycles, the scheduled A9/A8 area ratio versus A8 relationship will not provide an optimum match to the engine cycle demands. As a result, such engines will not deliver peak nozzle performance at certain key operating points.

Previously, because a nozzle throat had to always be at the maximum radius of the centerbody, any variation in values for A8 had to be accommodated by the difference between the minimum and maximum radius of the inner shroud. In contrast, the present embodiments allow for extra translation of the shrouds, and for more variation in the relative position of the centerbody and the shrouds.

Despite attempts in the prior art to provide overlapping flap and seal nozzles seeking to enable independent A9 and A8 control, the prior art nozzles continue to suffer from excessive complexity and sealing difficulties.

Other prior art exhaust systems have been attempted seeking an effective arrangement of translating contoured shrouds and fixed internal plugs with a goal of enabling some A8 variation. Such systems provide a "scheduled" A9/A8 characteristic where for each A8 there is a unique A9/A8. Furthermore, the translating shroud design is much simpler than the overlapping flap and seal nozzle, has fewer leakage paths, and can be substantially lighter. However, for systems wherein the engine cycle demands two vastly different nozzle pressure ratios at a given nozzle throat area A8; such as for example not meant to be limiting, P8/Pamb=2.5 at one flight condition and P8/Pamb=20.0 at another flight condition, both conditions retaining nearly the same value for A8, the nozzle of such systems will not be able to attain a geometry that will provide desired performance for operation at both flight conditions.

Accordingly, there is a need for an exhaust nozzle that provides independent control of the throat area, A8, and the area ratio, A9/A8, using a simple, robust structure and which allows for increased amounts of translation over past nozzles.

SUMMARY OF THE INVENTION

All of the above outlined features are to be understood as exemplary only and many more features and objectives of the embodiments may be gleaned from the disclosure herein. Therefore, no limiting interpretation of this summary is to be understood without further reading of the entire specification and drawings included herewith.

According to one aspect of the technology described herein, 1. a method for controlling a fluid flow through an exhaust nozzle includes: providing a centerbody extending rearward along a longitudinal axis, the centerbody including a maximum diameter section relative to the remainder of the centerbody; providing an inner shroud surrounding the centerbody, the inner shroud having an outer surface and an inner surface, the inner surface including at least a middle section of decreased diameter relative to the remainder of the inner surface, the inner shroud terminating at an aft edge; providing an outer shroud surrounding the inner shroud, the outer shroud having a forward edge, an aft edge, and an inner surface extending from the forward edge to the aft edge, wherein the centerbody and the inner shroud collectively define a throat area of the nozzle, and the outer shroud and the centerbody collectively define an exit area of the nozzle; selectively translating the inner shroud and outer shroud to vary the throat area; and selectively translating the outer shroud to vary the ratio of the exit area to the throat area; wherein the inner shroud is movable between forward and aft positions, wherein, when the inner shroud is in the forward position, its aft edge is forward of the maximum diameter section of the centerbody, such that the throat area of the nozzle is formed between the aft edge of the inner shroud and the centerbody.

According to another aspect of the technology described herein, a nozzle for a gas turbine engine includes: a centerbody extending along a longitudinal axis and including, sequentially, a sloping forward section, a maximum diameter section, and an aft section; an annular inner shroud having an outer surface an inner surface, the inner surface including a middle section of decreased diameter relative to the remainder of the inner surface, the inner shroud terminating at an aft edge and being selectively moveable along the longitudinal axis between forward and aft positions relative to the centerbody; an annular outer shroud having an inner surface and an outer surface, the outer shroud being selectively movable between forward and aft positions relative to the centerbody; and actuators operable to independently translate the inner and outer shrouds between their respective forward and aft positions; wherein, when the inner shroud is in its forward position, its aft edge is forward of the maximum diameter section of the centerbody, such that a throat area of the nozzle is formed between the aft edge of the inner shroud and the sloping forward section of the centerbody.

According to another aspect of the technology described herein, a gas turbine engine includes: a compressor, a combustor, and a turbine disposed in series flow sequence along a longitudinal axis; a nozzle disposed downstream of the turbine, including: a centerbody extending along the longitudinal axis and including, sequentially, a sloping forward section, a maximum diameter section, and an aft section; an annular inner shroud having an outer surface and an inner surface, the inner surface including a middle section of decreased diameter relative to the remainder of the inner surface, the inner shroud terminating at an aft edge and being selectively moveable along the longitudinal axis between forward and aft positions relative to the centerbody; an annular outer shroud having an inner surface and an outer surface, the outer shroud being selectively movable between forward and aft positions relative to the centerbody; and actuators operable to independently translate the inner and outer shrouds parallel to the longitudinal axis; wherein, when the inner shroud is in its forward position, its aft edge is forward of the maximum diameter section of the centerbody, such that a throat area of the nozzle is formed between the aft edge of the inner shroud and the sloping forward section of the centerbody.

BRIEF DESCRIPTION OF THE DRAWINGS

The above-mentioned and other features and advantages of these exemplary embodiments, and the manner of attaining them, will become more apparent and the nozzle feature will be better understood by reference to the following description of embodiments taken in conjunction with the accompanying drawings, wherein.

DETAILED DESCRIPTION OF THE INVENTION

Figure 1:
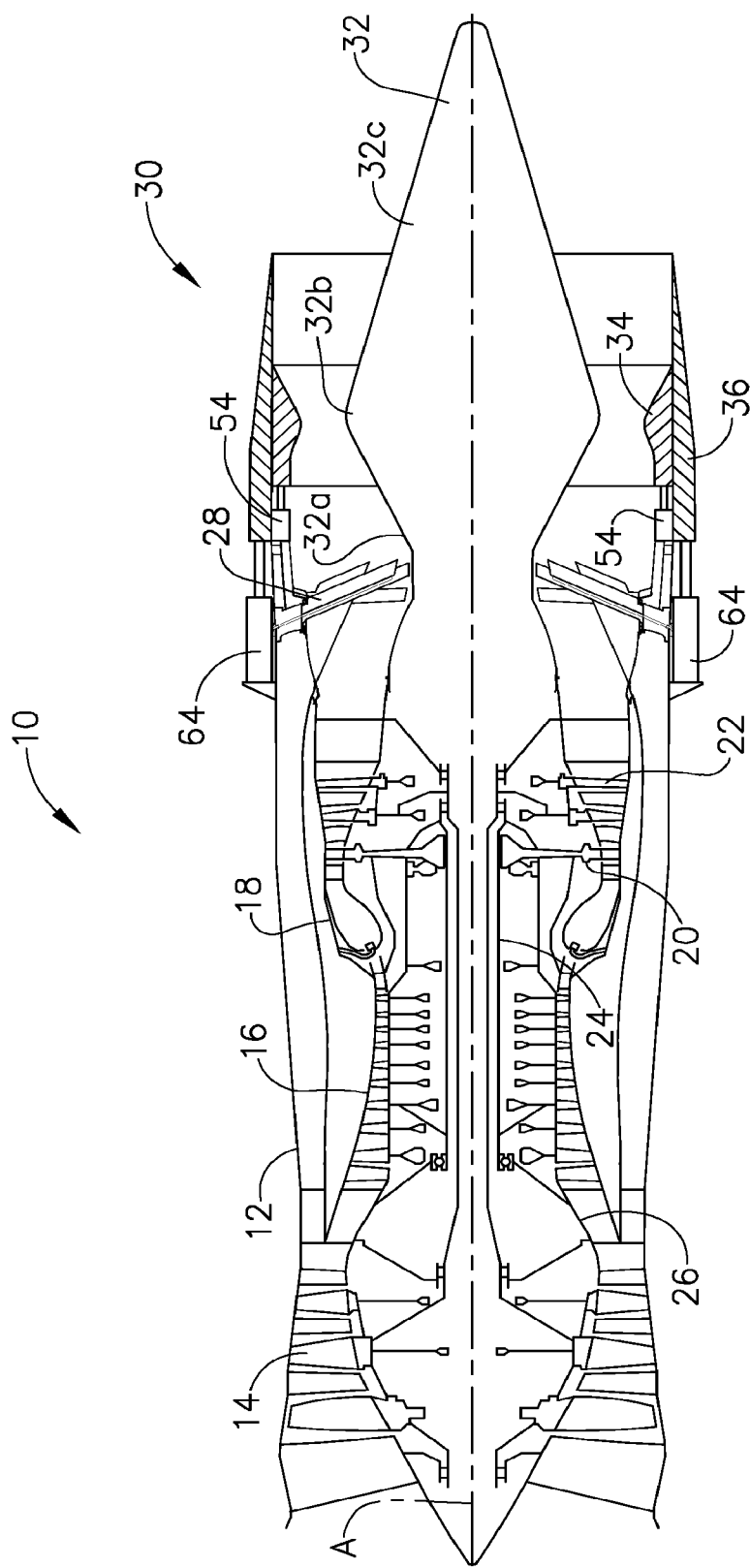
FIG. 1 is a schematic side cross-sectional view of a gas turbine engine.

Reference now will be made in detail to embodiments provided, one or more examples of which are illustrated in the drawings. Each example is provided by way of explanation, not a limitation of the disclosed embodiments. The present embodiments apply to the gas turbine engine, for example aeronautical, power generation, industrial or marine, in which a combustor burns fuel and for which aircraft operation in the supersonic flight regime is intended. Embodiments herein utilize current plug nozzle technology to include the use of existing linear actuators. The embodiments provide the ability to further optimize nozzle performance over all flight conditions.

Present embodiments relate to engines for supersonic aircraft. In particular, engines intended for operation in supersonic flight require a large variability in nozzle throat area (A8), with associated dimensional units for area typically selected from a group of at least m2, in2 or ft2), nozzle exit area (A9), and area ratio (A9/A8), a dimensionless value) in order to meet requirements of an operation cycle and maintain good performance at a wide range of nozzle pressure ratios (P8/Pamb) wherein P8 refers to a pressure measurement taken at the nozzle throat and Pamb refers to ambient pressure. For clarity, although others in the art use the term "expansion ratio" with analogous intent, it is understood that the area ratio A9/A8 as described herein will be the term taught and applied throughout with respect to the present embodiments.

Embodiments include those wherein further translation is provided to the inner nozzle shroud thereby allowing the nozzle to operate in a "converging-only" mode for larger A8 values where the nozzle pressure ratio P8/Pamb is generally low. Alternatives include those wherein the nozzle maintains a "converging-diverging" shape for smaller A8 values and, in general, for associated flight conditions for which the pressure ratio P8/Pamb is generally higher, requiring full expansion, as reflected in high values for the area ratio A9/A8, to achieve performance goals.

In particular, by enabling the throat to set up on a forward portion of the centerbody, the inner shroud maximum radius can be smaller than in previous designs. This novel approach avoids overexpansion at low pressure ratios and improves engine performance metrics such as thrust, efficiency, and acoustics.

While embodiments are provided applicable to all engine configurations, engines having cycles that require a large range of values for throat area A8 will realize the best performance in implementing these embodiments.

With reference to U.S. Pat. No. 7,174,704, alternatives herein expand upon the capability of the teachings therein by adding further actuation range to shrouds (analogous structure to shrouds illustrated in the Figures herein having reference numerals 34 and 36) in order to set up a mode of operation wherein embodiments include a nozzle acting with a converging-only, variable, exit area A9.

Referring to the drawings wherein identical reference numerals denote the same elements throughout the various views, FIG. 1 illustrates a representative gas turbine engine, generally designated 10. The engine 10 has a longitudinal center line or axis illustrated as A in the Figures, and an outer stationary annular casing 12 disposed concentrically about and coaxially along the axis A. The engine 10 has a fan 14, compressor 16, combustor 18, high pressure turbine 20, and low pressure turbine 22 arranged in serial flow relationship. In operation, pressurized air from the compressor 16 is mixed with fuel in the combustor 18 and ignited, thereby generating combustion gases. Some work is extracted from these gases by the high pressure turbine 20 which drives the compressor 16 via an outer shaft 24. The combustion gases then flow into the low pressure turbine 22, which drives the fan 14 via an inner shaft 26. An afterburner 28, or augmentor, may optionally be provided for increasing the thrust of the engine 10 as needed for enhanced aircraft acceleration, maneuverability, or speed.

The engine 10 includes a nozzle 30 constructed in accordance with the present embodiments. The basic components of the nozzle 30 are a centerbody 32, an inner shroud 34, and an outer shroud 36. The centerbody 32 is centered along the longitudinal axis A of the engine 10 and extends in an aft direction. The centerbody 32 includes, sequentially, a small-diameter tapered forward section 32A, a maximum diameter section 32B and an aft section 32C which tapers in diameter to form an aft-facing conical shape. The centerbody 32 is formed from an appropriate material such as, for example not meant to be limiting, a heat-resistant metal alloy, a ceramic matrix composite, or any other material suitable for the environment.

Embodiments provide that the nozzle 30 configuration is selectably chosen as desired and wherein shrouds 34, 36 and centerbody 32 are placed in any disposition within their respective range of translating motion thereby defining the fluid flow path from forward to aft through the nozzle 30. Alternatives further comprise independent translation of the centerbody 32 with respect to the shrouds 34, 36.

Figure 2:
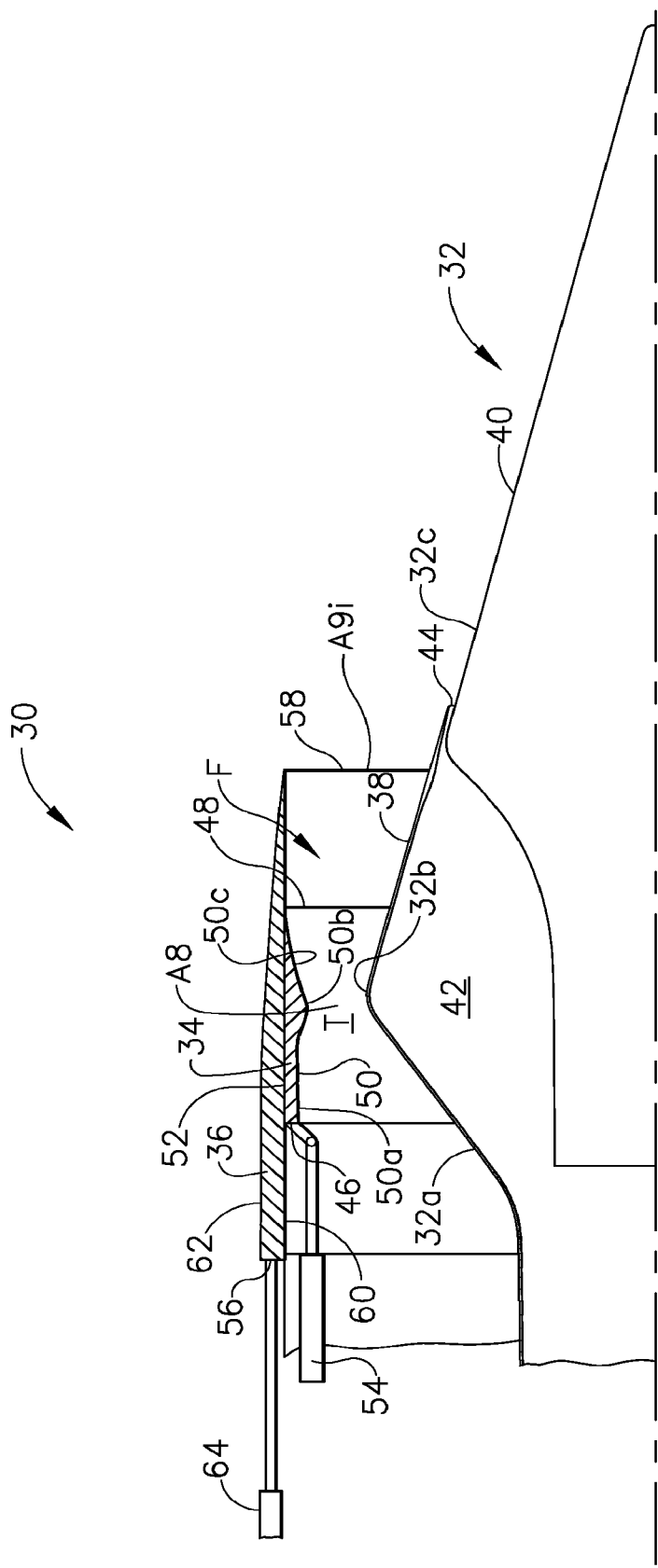
FIG. 2 is a partial sectional view of a nozzle assembly constructed in accordance with the present embodiments and in an operating configuration.

For example not meant to be limiting, FIG. 2 illustrates the nozzle 30 configured for operation in a supersonic (M>1) cruise flight condition. The half-sectional view of FIG. 2 illustrates the nozzle 30 in more detail. In the illustrated example of FIG. 2, the centerbody 32 is hollow and comprises an outer section 38 surrounding an inner section 40 which cooperatively define a plenum 42. The forward end of the plenum 42 is in fluid communication with a source of pressurized air (not shown) such as compressor bleed air or fan bypass air. The aft end of the plenum 42 terminates in an exit slot 44 which allows pressurized air from the plenum 42 to be directed along the surface of the centerbody 32 thereby allowing for boundary layer control or cooling.

In further detail and with continued reference to FIG. 2, the inner shroud 34 surrounds the centerbody 32. In the illustrated example the centerbody 32 and the inner shroud 34 are bodies of revolution, however other embodiments provide two-dimensional, oval, or polygonal shapes. The inner shroud 34 has a forward edge 46, an aft edge 48, an inner surface 50, and an outer surface 52. The inner surface 50 faces the centerbody 32. The inner surface 50 includes in sequential order, a forward cylindrical section 50A, a reduced-diameter middle section 50B, and a tapered aft section 50C. The outer surface 52 is cylindrical or otherwise of constant cross-section along its length. The inner shroud 34 is constructed from appropriate materials such as known heat-resistant metallic alloys, ceramic metal composites or any other suitable material for the environment, and alternatives are monolithically formed as a single integral part. For embodiments of the inner shroud that are formed from assembling multiple components, the components are not required to move relative to each other and thus any inter-component gaps are reliably sealed. The inner shroud 34 is connected to one or more inner shroud actuators 54 of a known type such as hydraulic piston-cylinder assemblies, which are anchored to a relatively static portion of the engine 10. The inner shroud actuators 54 allow the inner shroud 34 to be selectively translated parallel to the longitudinal axis A of the engine 10.

The outer shroud 36 surrounds the inner shroud 34. In the illustrated example the outer shroud 36 is a body of revolution, however other embodiments provide two-dimensional, oval, or polygonal shapes. The outer shroud 36 has a forward edge 56, an aft edge 58, an inner surface 60, and an outer surface 62. The inner surface 60 faces the centerbody 32. The inner surface 60 is generally cylindrical or otherwise of constant cross-sectional area along its length. The outer surface 62 may be exposed to external airflow and has a profile shaped to meet relevant design requirements to include drag minimization. The outer shroud 36 is constructed from appropriate materials such as known heat-resistant metallic alloys, ceramic matrix composites, or any other material suitable for the environment, and alternatives are monolithically formed as a single integral part. For embodiments of the outer shroud that are formed from assembling multiple components, the components are not required to move relative to each other and thus any inter-component gaps are reliably sealed. The outer shroud 36 is connected to one or more outer shroud actuators 64 of a known type such as hydraulic piston-cylinder assemblies, which are anchored to a relatively static portion of the engine 10. The outer shroud actuators 64 allow the outer shroud 36 to be selectively translated along a selected path of motion, alternatives including those wherein translation is parallel to the longitudinal axis A of the engine 10.

The inner surfaces 50 and 60 of the inner 34 and outer 36 shrouds, respectively, cooperate with the surface of the centerbody 32 to define an annular gas flow path "F" through the nozzle 30. The throat "T" of the nozzle 30 is shown where the flow path "F" has its minimum nozzle throat area A8 and is located between the middle section 50b of the inner surface 50 of the inner shroud 34 and the maximum diameter section 32b of the centerbody 32. The exit area A9, or more precisely, the internal exit area denoted A9i, is located between the outer shroud 36 and the centerbody 32, coplanar with the aft edge 58 of the outer shroud 36.

In operation, translation of the inner 34 and outer 36 shrouds independently changes the throat area A8 or the nozzle 30 area ratio A9i/A8 as desired. With continued reference to FIG. 2, the inner shroud 34 is disposed in a longitudinal position in which the middle section 50b of its inner surface 50 is coplanar with the maximum diameter section 32b of the centerbody, providing the minimum nozzle throat area, A8. The outer shroud 36 is disposed in a longitudinal position near its aft limits of motion, providing a high nozzle 30 area ratio, A9i/8.

Figure 3:
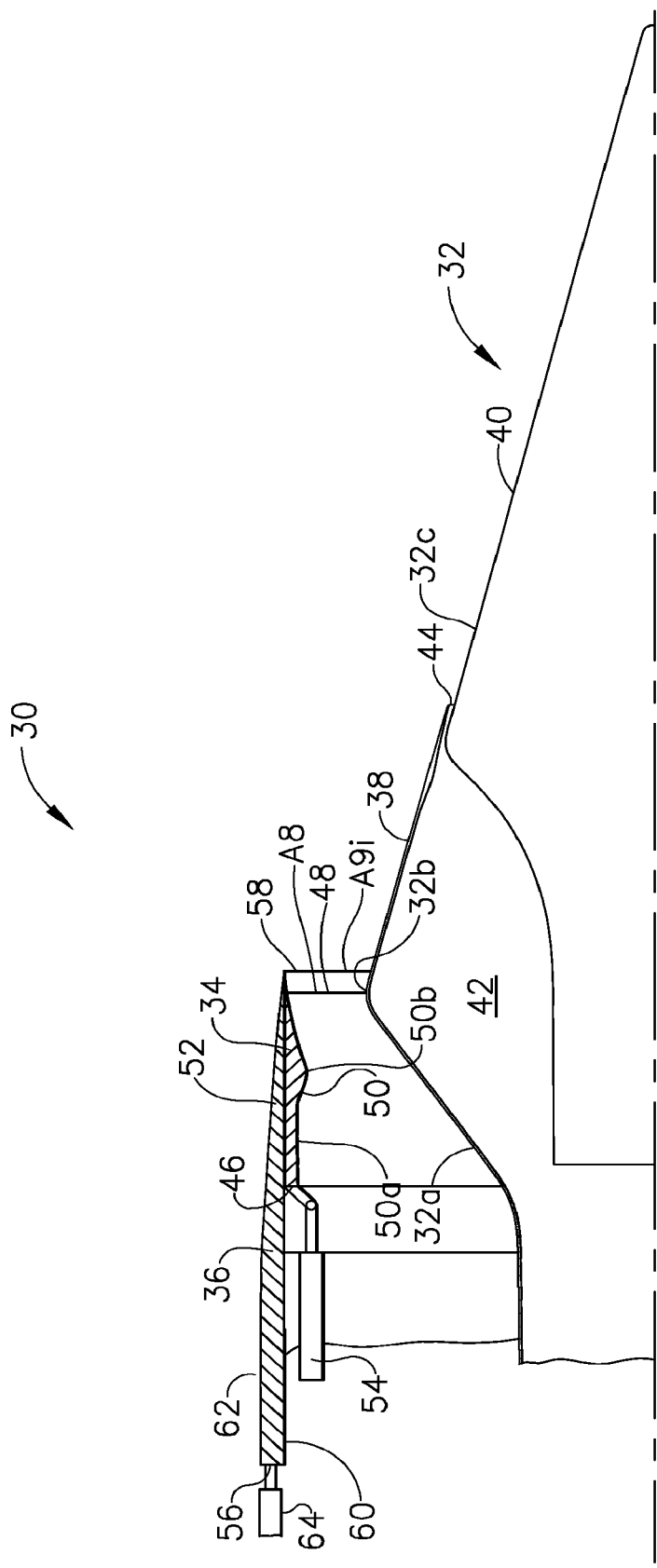
FIG. 3 is a view of the nozzle assembly of FIG. 2 in an alternate operating configuration.

FIG. 3 illustrates the nozzle 30 configured for operation in a takeoff or subsonic cruise flight condition. The inner shroud 34 is disposed in a forward longitudinal position in which the middle section 50B of its inner surface 50 is displaced forward of the maximum diameter section 32B of the centerbody 32, providing the maximum nozzle throat area, A8 in a converging-diverging configuration. The outer shroud 36 is disposed in a longitudinal position near its forward limits of motion with respect to the inner shroud 34, providing a nozzle 30 area ratio, A9i/A8, having a value near unity.

With continued reference to FIG. 3 and for example, not meant to be limiting, of one of the multiple and interchangeable embodiments, the nozzle 30 throat is defined by the minimum flow area between the centerbody 32 and inner shroud 34. Embodiments provide that the throat is formed based on the relative position of the inner 34 and outer 36 shrouds to the centerbody 32. With respect to the configuration illustrated in FIG. 2, the inner shroud 34 is disposed in the aft position and the throat is formed between the maximum radius point of the centerbody 32 and the minimum radius point of the inner shroud 34. In this configuration there is a divergent section to the nozzle 30. At an intermediate disposition (see FIG. 3), the throat is located between the maximum radius point of the centerbody 32 and the aft edge 48 of the inner shroud 34. In this intermediate disposition there is no divergent section to the nozzle 30. The minimum flow area, where the throat is formed, is also the aft-most internal area.

Consider an example of the above-stated the nozzle 30 configuration being selectably chosen as desired and wherein shrouds 34, 36 and centerbody 32 are placed in any disposition within their respective range of translating motion thereby defining the fluid flow path through the nozzle 30. Other subsonic cruise flight conditions find the nozzle 30 configured to have the shrouds 34, 36 and centerbody 32 disposed anywhere within a range that is between the configurations illustrated FIG. 2 and FIG. 3.

Figure 4:
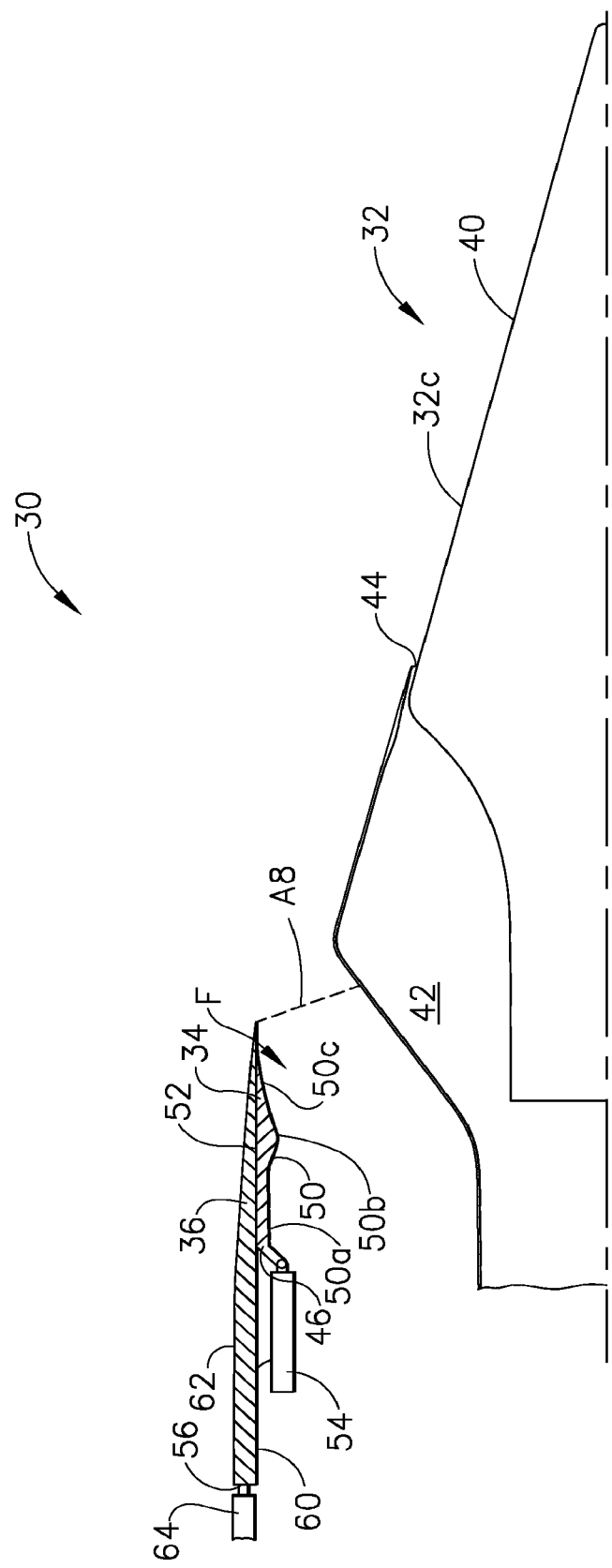
FIG. 4 is a view of the nozzle assembly of FIG. 2 in another alternate operating configuration.

FIG. 4 illustrates the nozzle 30 configured for operation in a low-speed, low-power flight condition. The FIG. 4 configuration can be associated with operations wherein acoustics measurements are taken relating to "cutback", "sideline" or "approach" flight conditions. As illustrated by the example of FIG. 4, the throat is formed between the aft edge 48 of the inner shroud 34 and the forward sloping portion of the centerbody 32. The values for nozzle throat area, A8, are largest in this configuration. In this example, the exit area, A9, is defined by the distance between the aft edge of the outer shroud 58 and the maximum diameter section 32B of the centerbody 32. This results in the avoidance of overexpansion at low pressure ratios and improved performance metrics such as thrust, efficiency, and acoustics. This provides the ability to further optimize nozzle performance over all flight conditions.

The independent translation of the inner and outer shrouds 34 and 36 may be controlled, as desired, by means such as, for example not meant to be limiting, manual inputs to the inner and outer shroud actuators 54 and 64. Alternatives provide that the shroud 34, 36 positions for different engine 10 operating configurations and flight conditions are scheduled as a function of several engine operating parameters such as the engine pressure ratio, compressor inlet temperature, fan speed, free stream Mach number, etc. These parameters may be sent to a known type of controller, such as a full authority digital electronic control (FADEC) (not illustrated for clarity in the Figures) which transforms calculations relating selected parameters into position commands sent to the actuators 54, 64 of the inner and outer shroud 34, 36, respectively. For embodiments having an independently translating centerbody 32, control of centerbody 32 translation means are selected from at least the example not meant to be limiting above.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of and "consisting essentially of shall be closed or semi-closed transitional phrases, respectively, as set forth in the United States Patent Office Manual of Patent Examining Procedures, Section 2111.03.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

What is claimed is:

1. A method for controlling a fluid flow through an exhaust nozzle of a gas turbine engine for a supersonic aircraft, the method comprising:
    providing a centerbody extending rearward along a longitudinal axis, the centerbody including a maximum diameter section relative to the remainder of the centerbody;
    providing an inner shroud surrounding the centerbody, the inner shroud having an outer surface and an inner surface, the inner surface including at least a middle section of decreased diameter relative to the remainder of the inner surface, the inner shroud terminating at an aft edge;
    providing an outer shroud surrounding the inner shroud, the outer shroud having a forward edge, an aft edge, and an inner surface extending from the forward edge to the aft edge, wherein the centerbody and the inner shroud collectively define a throat area of the exhaust nozzle, and the outer shroud and the centerbody collectively define an exit area of the exhaust nozzle;
    selectively translating the inner shroud and the outer shroud to vary the throat area; and
    selectively translating the outer shroud to vary a ratio of the exit area to the throat area,
    wherein the inner shroud is movable between forward and aft positions, wherein, when the inner shroud is in the forward position, the aft edge of the inner shroud is forward of the maximum diameter section of the centerbody, such that the throat area of the exhaust nozzle is formed between the aft edge of the inner shroud and the centerbody, and
    wherein the outer shroud is movable between forward and aft positions, wherein, when the outer shroud is in the forward position, the aft edge of the outer shroud is forward of the maximum diameter section of the centerbody, such that the exit area of the exhaust nozzle is formed between the aft edge of the outer shroud and the centerbody.

2. The method of claim 1, wherein the centerbody includes, sequentially, a sloping forward section, the maximum diameter section, and an aft section.

3. The method of claim 2, wherein the aft section of the centerbody tapers in diameter to form an aft-facing conical shape.

4. The method of claim 1, wherein the throat area is at a minimum size when the inner shroud is at the aft position, and the throat area is at a maximum size for a converging-diverging nozzle when the inner shroud is in an intermediate position, and is at a maximum size for a converging nozzle when the inner shroud is in the forward position.

5. The method of claim 1, further comprising independent translation of the centerbody with respect to the inner shroud and the outer shroud.

6. A gas turbine engine for a supersonic aircraft, the gas turbine engine having a nozzle for directing exhaust flow to atmosphere, the nozzle comprising:
a centerbody extending along a longitudinal axis and including, sequentially, a sloping forward section, a maximum diameter section, and an aft section;
an annular inner shroud having an outer surface and an inner surface, the inner surface including a middle section of decreased diameter relative to the remainder of the inner surface, the annular inner shroud terminating at an aft edge and being selectively moveable along the longitudinal axis between forward and aft positions relative to the centerbody;
an annular outer shroud having an inner surface and an outer surface, the annular outer shroud being selectively movable between forward and aft positions relative to the centerbody; and
actuators operable to independently translate the annular inner shroud and the annular outer shroud between the respective forward and aft positions of the annular inner shroud and the annular outer shroud,
wherein, when the annular inner shroud is in the forward position, the aft edge of the annular inner shroud is forward of the maximum diameter section of the centerbody, such that a throat area of the nozzle is formed between the aft edge of the annular inner shroud and the sloping forward section of the centerbody, and
wherein, when the annular outer shroud is in the forward position, an aft edge of the annular outer shroud is forward of the maximum diameter section of the centerbody, such that an exit area of the nozzle is formed between the aft edge of the annular outer shroud and the centerbody.

7. The gas turbine engine of claim 6, wherein the inner surface of the annular outer shroud defines a substantially constant cross-sectional area from a forward edge thereof to the aft edge thereof.

8. The gas turbine engine of claim 6, wherein the aft section of the centerbody tapers in diameter to form an aft-facing conical shape.

9. The gas turbine engine of claim 6, wherein the centerbody, the annular inner shroud, and the annular outer shroud are bodies of revolution about the longitudinal axis.

10. The gas turbine engine of claim 6, wherein the centerbody, the annular inner shroud, and the annular outer shroud are oval in cross-section.

11. A gas turbine engine for a supersonic aircraft, the gas turbine engine comprising:
a compressor, a combustor, and a turbine disposed in series flow sequence along a longitudinal axis;
a nozzle disposed downstream of the turbine, including:
a centerbody extending along the longitudinal axis and including, sequentially, a sloping forward section, a maximum diameter section, and an aft section;
an annular inner shroud having an outer surface and an inner surface, the inner surface including a middle section of decreased diameter relative to the remainder of the inner surface, the annular inner shroud terminating at an aft edge and being selectively moveable along the longitudinal axis between forward and aft positions relative to the centerbody;
an annular outer shroud having an inner surface and an outer surface, the annular outer shroud being selectively movable between forward and aft positions relative to the centerbody; and
actuators operable to independently translate the annular inner shroud and the annular outer shroud parallel to the longitudinal axis,
wherein, when the annular inner shroud is in the forward position, the aft edge of the annular inner shroud is forward of the maximum diameter section of the centerbody, such that a throat area of the nozzle is formed between the aft edge of the annular inner shroud and the sloping forward section of the centerbody, and
wherein, when the annular outer shroud is in the forward position, an aft edge of the annular outer shroud is forward of the maximum diameter section of the centerbody, such that an exit area of the nozzle is formed between the aft edge of the annular outer shroud and the centerbody.

12. The gas turbine engine of claim 11, wherein the inner surface of the annular outer shroud defines a substantially constant cross-sectional area from a forward edge thereof to the aft edge thereof.

13. The gas turbine engine of claim 11, wherein the aft section of the centerbody tapers in diameter to form an aft-facing conical shape.

14. The gas turbine engine of claim 11, wherein the centerbody, the annular inner shroud, and the annular outer shroud are bodies of revolution about the longitudinal axis.

15. The gas turbine engine of claim 11, wherein the centerbody, the annular inner shroud, and the annular outer shroud are oval in cross-section.

* * * * *